US007110772B1

(12) United States Patent
Wu

(10) Patent No.: US 7,110,772 B1
(45) Date of Patent: Sep. 19, 2006

(54) SYSTEM FOR PROVIDING LOCATION INDEPENDENT UNIFORM SERVICE ACCESS FOR COMMUNICATION SUBSCRIBERS

(75) Inventor: Charles C. Wu, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/344,261

(22) Filed: Jun. 25, 1999

(51) Int. Cl.
H04Q 7/20 (2006.01)
(52) U.S. Cl. .............................. 455/456.1; 455/404.2; 455/414.2
(58) Field of Classification Search ................ 455/456, 455/552, 427, 428, 461, 465, 462, 414, 417, 455/464, 553, 554, 566, 436, 437, 440, 445, 455/454
See application file for complete search history.

(56) References Cited

U.S. PATENT DOCUMENTS

| 5,568,153 | A | * | 10/1996 | Beliveau .................. 342/357.1 |
| 5,613,213 | A | * | 3/1997 | Naddell et al. ............. 455/414 |
| 5,734,980 | A | * | 3/1998 | Hooper et al. .............. 455/434 |
| 6,038,445 | A | * | 3/2000 | Alperovich et al. ........ 455/422 |
| 6,085,085 | A | * | 7/2000 | Blakeney et al. ........... 455/426 |
| 6,125,282 | A | * | 9/2000 | Urabe ........................ 455/552 |
| 6,259,917 | B1 | * | 7/2001 | Elzein ........................ 455/435 |

\* cited by examiner

Primary Examiner—Charles Craver
Assistant Examiner—Raymond S. Dean
(74) Attorney, Agent, or Firm—Patton Boggs LLP

(57) ABSTRACT

The system for providing location independent uniform service access for communication subscribers provides the capability to dynamically translate the local communications access paradigms to enable the subscriber to access the desired communications services without manually translating these access modalities from those known by the subscriber in their home service area to those used in this new locale. The implementation of the present system for providing location independent uniform service access for communication subscribers is illustrated as being resident in the subscriber's communication network access device. For example, the subscriber's wireless communication device can be equipped with an automated location determining capability, such as a Global Positioning System (GPS), or the location information can be obtained from the wireless base station, and a translation data base that maps the subscriber's local communications access paradigms into those corresponding communications access paradigms in use in the subscriber's present location. The subscriber's wireless communication device responds to the subscriber's data input indicative of an access to a desired communications service by translating the input data into the data script that corresponds to the communications access paradigm in use at the present location for the desired communications service.

6 Claims, 3 Drawing Sheets

| LATITUDE/LONGITUDE MAP RANGE | AREA CODE | LOCAL ACCESS NUMBER | LOGICAL SERVICE IDENTIFIER |
|---|---|---|---|
| 42:09 – 42:13/23:32 – 23:39 | 303 | 497-0968 | – |
| 40:23 – 42:09/20:22 – 23:32 | 970 | 872-4090 | – |
| 37:55 – 40:23/17:33 – 20:22 | 719 | 772-3475 | – |
|  | – | 199 | 911 |
| ⋮ | ⋮ | ⋮ | ⋮ |

SYSTEM FOR PROVIDING LOCATION INDEPENDENT UNIFORM SERVICE ACCESS FOR COMMUNICATION SUBSCRIBERS

FIELD OF THE INVENTION

This invention relates to communications systems and, in particular, to a system for providing subscribers with uniform access to standard communication services and/or their home location subscribed services using address information that is independent of their location in the communication network, which is accomplished by providing a location sensitive context mapping to logically defined services.

Problem

It is a problem in the field of communication systems to enable a subscriber to obtain access to standard communication services and/or their home location subscribed services using address information that is independent of their location in the communication network. In particular, the subscriber typically has a number of local communication access paradigms that are used to access specific desired communication services at their home location. These communication services can be wire based, such as: standard telephone station set voice services (voice mail, operator, directory assistance), personal computer Internet access via a particular Internet Service Provider, emergency services, cable television channel access (MTV, HBO, etc); or wireless communication services such as: personal computer Internet access via a particular Internet Service Provider, emergency services, wireless voice mail, radio station access (National Public Radio), television station access (ABC, NBC, CNN, etc), and the like. However, as the subscriber travels outside the bounds of the local service region, the local communications access paradigms change and the subscriber is not able to access the desired communications services without manually translating these access modalities from those known by the subscriber in their home service area to those used in this new locale. In some cases, the subscriber is unable to provide the translation without undue expenditure of research efforts or the transition occurs frequently enough in the course of the subscriber's travels to render the translation effort impractical.

Unfortunately, the existing communication networks do not maintain a uniform means of accessing the standard communication services and/or a subscriber's home location subscribed services independent of the subscriber's location in the communication network. There is presently no capability in such communication systems or the subscriber's terminal devices to translate the subscribers' identification of the desired destinations to access numbers or access modalities that are assigned at the subscriber's present location.

Solution

The above described problems are solved and a technical advance achieved in the field by the present system for providing location independent uniform service access for communication subscribers. This system provides the capability to dynamically translate the local communications access paradigms to enable the subscriber, who is away from their home service area, to access the desired communications services without manually translating the associated service access modalities from those known by the subscriber in their home service area to those used in this new locale.

The implementation of the present system for providing location independent uniform service access for communication subscribers is illustrated as being resident in the subscriber's communication device. For example, in the case of wireless communications services the subscriber's wireless communication device can be equipped with an automated location determining capability, such as a Global Positioning System (GPS) (or can receive location information from the wireless base station) and a translation data base that maps the subscriber's local communications access paradigms into those corresponding communications access paradigms in use in the subscriber's present location. Alternatively, the data can be stored in a database located external to the subscriber's communication device and accessible to the subscriber's communication device. The subscriber's wireless communication device responds to the subscriber's data input indicative of an access to a desired communications service by translating the input data into the data script that corresponds to the communications access paradigm in use at the present location for the desired communications service. Thus, in response to the subscriber inputting the telephone number of the subscriber's Internet Service Provider on their wireless communication device, the wireless communication device intercepts this data and uses it along with the output of the GPS receiver resident in the subscriber's wireless communication device, to access a translation table to identify the local access number of the subscriber's Internet Service Provider. This new access number is transmitted by the subscriber's wireless communication device to initiate the desired access of the subscriber's Internet Service Provider via a local communication connection. As the subscriber roams from one service area to another, the handoff process includes a translation of the local presence of the desired dessication, if any, and a seamless handoff among destinations to maintain a local call connection to the desired destination.

There are numerous other communications services that are capable of using this feature. For example, the subscriber may wish to access a language-specific operator so that they communicate in their native language with operators, regardless of the subscriber's location. Similarly, services can be accessed in a logical manner by translating the subscriber-centric understanding of the service to the local service access paradigm. Therefore, a United States based subscriber dials "911" for emergency services, while a European subscriber would dial "119" for the same services in their locale. These subscribers can therefore access the desired emergency services by dialing their usual access number and the present system for providing location independent uniform service access for communication subscribers provides a location sensitive context mapping to the logically defined service by simply translating the subscriber dialed number to the local access number for that service. The additional capability of directing the call to an operator specifically trained to speak the subscriber's native language can optionally be included in this translation process.

This same philosophy can be used to provide analogous service in many other subscriber terminal devices. For example, most radios include preprogrammed buttons the enable the subscriber to access certain predetermined subscriber selected radio stations. Many of these selections represent local affiliates of a nationwide radio station network. Thus, the nationwide network maintains a list of affiliates, which is programmed into the radio, to operate in conjunction with a GPS receiver located therein. Thus, when the user makes a selection on the radio of one of the preprogrammed buttons to select the affiliates of the nationwide radio station network operational in the subscriber's home area, the radio activates the GPS and data retrieval elements to identify the radio station, operating in the present locale, that corresponds to the subscriber selected affiliate of the nationwide radio station network. The radio then retunes to the operating frequency of this local affiliate, without the need for the subscriber to locate the desired radio station and retune the radio to that station. As the subscriber moves from one location to another, the radio can perform a handoff function, similar to that used in wireless communication devices, to locate another local radio station that corresponds to the one presently selected by the subscriber, to thereby maintain a strong signal.

DETAILED DESCRIPTION

Figure 1:
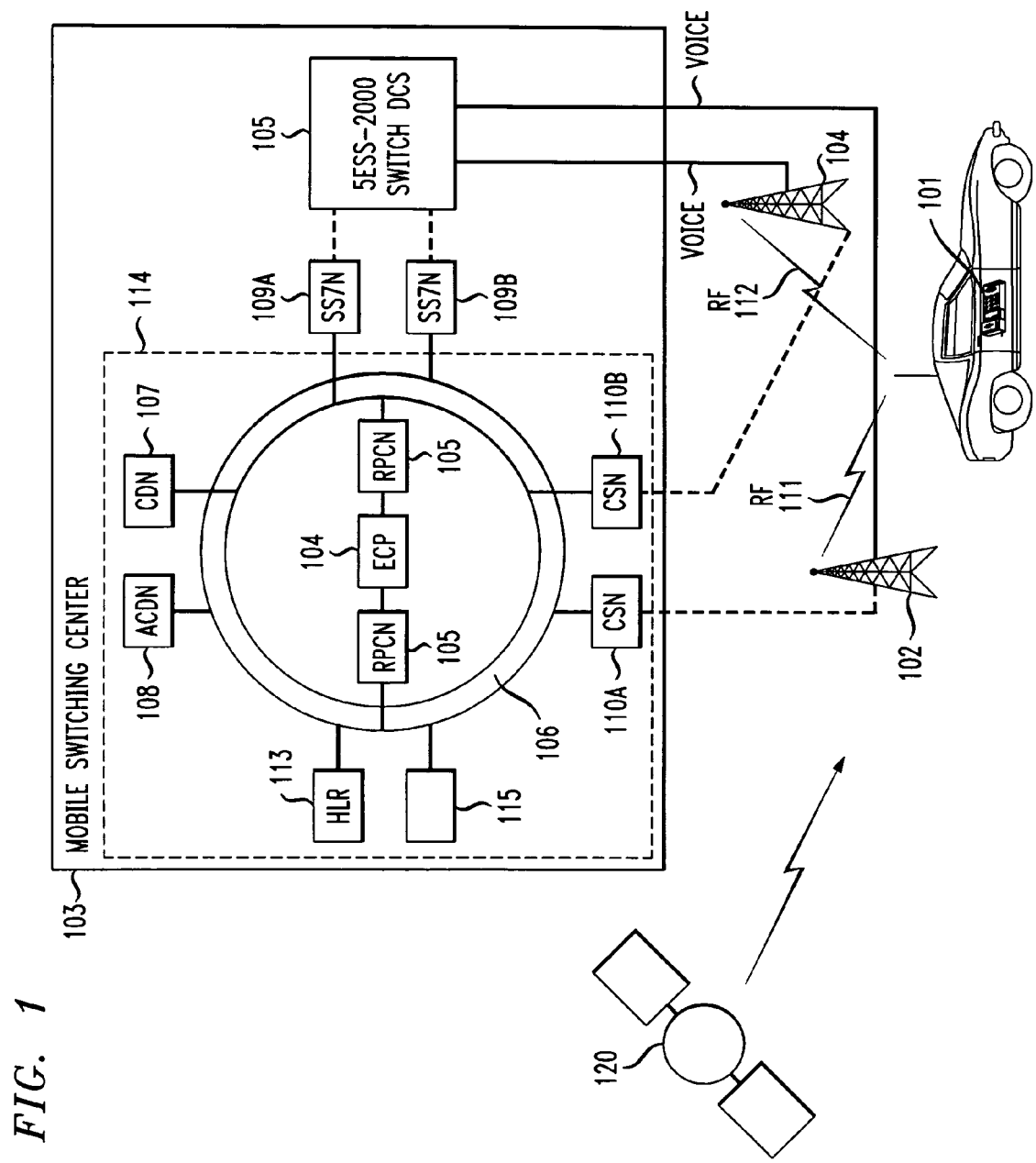
FIG. 1 is the block diagram of the architecture of the present system for providing location independent uniform service access for communication subscribers and one example of an existing commercial wireless communications system in which it is implemented.

The present system for providing location independent uniform service access for communication subscribers provides the capability to dynamically translate the local communications access paradigms to enable the subscriber, who is away from their home service area, to access the desired communications services without manually translating these access modalities from those known by the subscriber in their home service area to those used in this new locale. The implementation of the present system for providing location independent uniform service access for communication subscribers is illustrated as being resident in the subscriber's communication network access device.

For the sake of illustration, the example of a wireless communication device is used. The wireless communication device can be equipped with an automated location determining capability, such as a Global Positioning System (GPS) (or can receive the location information from the wireless base station) and a translation data base that maps the subscriber's local communications access paradigms into those corresponding communications access paradigms in use in the subscriber's present location. The subscriber's wireless communication device responds to the subscriber's data input indicative of an access to a desired communications service by translating the input data into the data script that corresponds to the communications access paradigm in use at the present location for the desired communications service. Thus, in response to the subscriber inputting the telephone number of the subscriber's Internet Service Provider on their wireless communication device, the wireless communication device intercepts this data and uses it along with the output of the GPS receiver resident in the subscriber's wireless communication device, to access a translation table to identify the local access number of the subscriber's Internet Service Provider. This new access number is transmitted by the subscriber's wireless communication device to initiate the desired access of the subscriber's Internet Service Provider via a local communication connection. As the subscriber roams from one service area to another, the handoff process includes a translation of the local presence of the desired destination, if any, and a seamless handoff among destinations to maintain a local call connection to the desired destination.

Cellular Mobile Telecommunication Systems

Cellular mobile telecommunication systems represent one example of wireless communications systems and function to provide the service of connecting mobile telecommunications customers, each having a wireless communication device, to both land-based customers who are served by the common carrier public telephone network as well as other mobile telecommunications customers. In such a system, all incoming and outgoing calls are routed through the mobile switching center (MSC), which is connected to a plurality of base stations which communicate with wireless communication devices located in the area covered by the base stations. The wireless communication devices are served by the base stations, each of which is located in one cell of a larger service region. Each base station in the service region is connected by a group of communication links to the mobile switching center, with the communication link being either direct or indirect through a controller that may span a plurality of base stations. A communication link transports user data, which may be a digital representation of voice, between the base station and the mobile switching center. Each base station contains a group of radio transmitters and receivers, with each transmitter-receiver pair being connected to one communication link. Each transmitter-receiver pair operates on a pair of radio frequencies: one frequency to transmit radio signals to the mobile subscriber unit and the other frequency to receive radio signals from the mobile subscriber unit.

The operation of the present system for providing guaranteed wireless communication service to priority wireless communication subscribers is independent of the wireless communication technology used to provide wireless communication services and in fact can be provisioned to span multiple wireless communication technologies. The example used herein describes a CDMA wireless communication system and with CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a wireless communication device is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The mobile communication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the wireless communication devices to the selected radio frequency.

Each cell in the ground-based cellular mobile telecommunication network comprises a predetermined volume of space radially arranged around the base station transmitting antenna with the region of space roughly approximating a cylindrical volume having a limited height. Since all of the wireless communication devices are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a ground-based wireless communication device initiates a call connection, control signals from the local base station transmitter cause the frequency agile transceiver in the ground-based wireless communication device to operate at the frequency of operation and orthogonal coding designated for that particular base station. As the ground-based wireless communication device moves from one base station to another, the call connection is handed off to the successive base stations and the frequency agile transceiver in the ground-based wireless communication device adjusts its frequency of operation and/or orthogonal coding of the transmitter located at the base station in which the ground-based wireless communication device is presently operational. Furthermore, with CDMA, it is possible that a wireless communication device may be simultaneously communicating with a plurality of base stations. Such a configuration is commonly called a soft handoff and is preferable to hand-offs in which a wireless communication device is transferred from one base station to another. The latter type of handoff is commonly called a hard handoff. With a soft handoff, base stations are added or dropped from the plurality of base stations serving the wireless communication device as the wireless communication device traverses the serving area supported by the mobile switching center. However, all of the base stations in the plurality of base stations serving the wireless communication device must communication with the given wireless communication device on the same transmitter-receiver frequencies.

Communications System Architecture

Figures 2, 4:
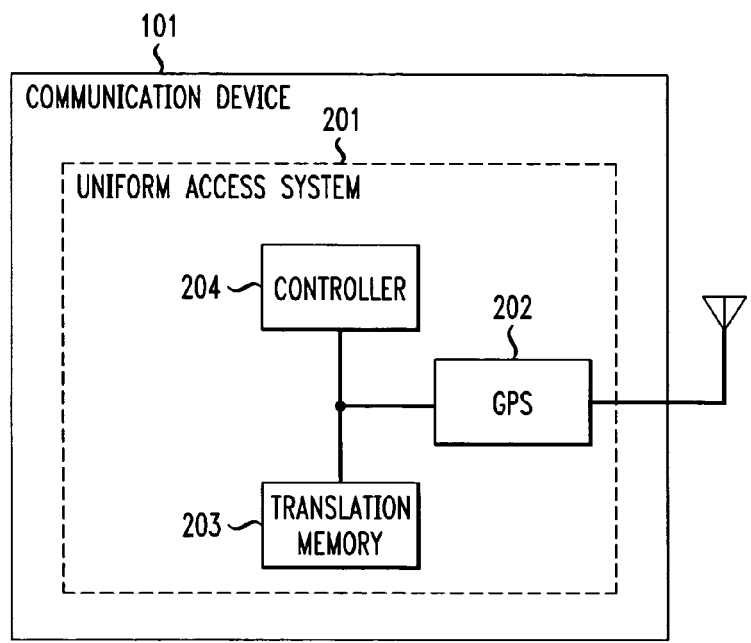
FIG. 2 illustrates in block diagram form the architecture of the present system for providing location independent uniform service access for communication subscribers.
FIG. 4 illustrates a typical data structure used to define the correspondence between subscriber selected standard communication services and/or their home location subscribed services.
Figure 3:
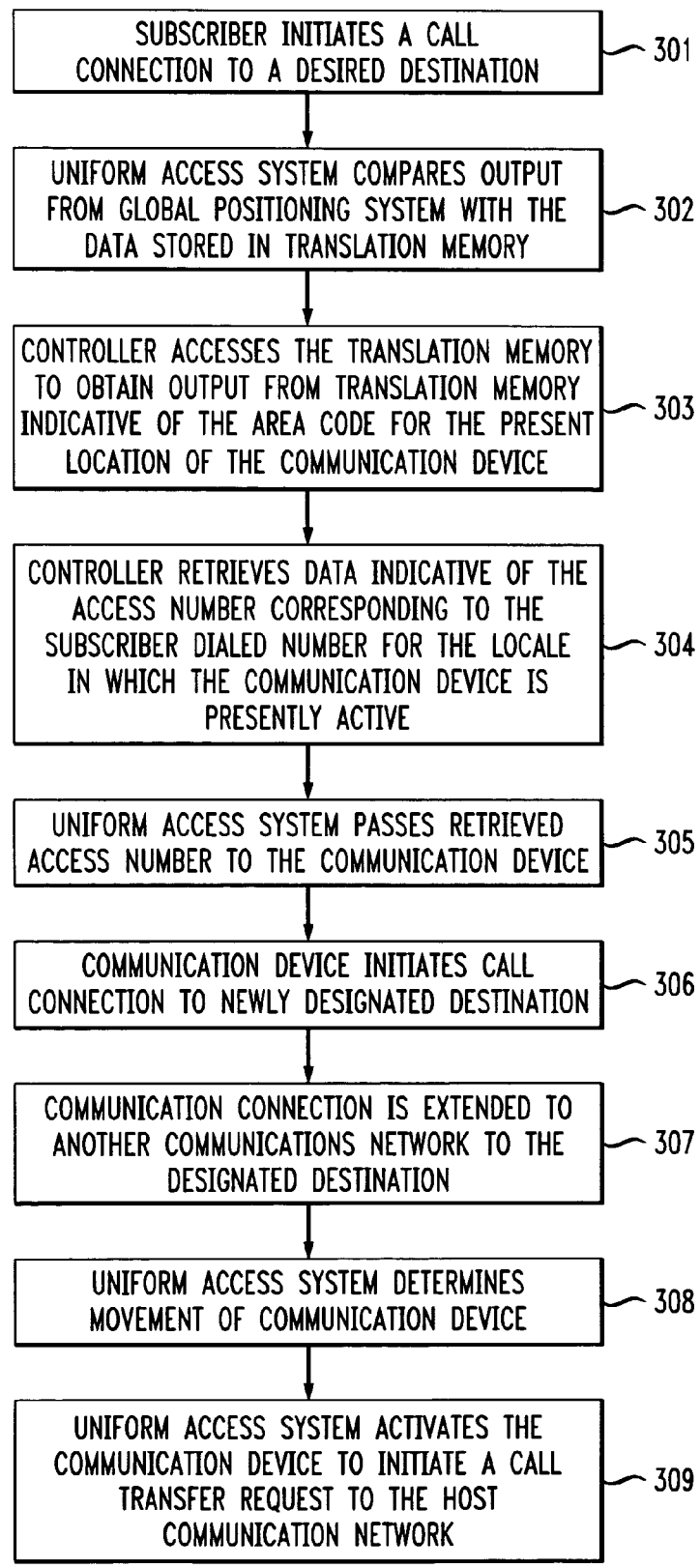
FIG. 3 illustrates in flow diagram form the operation of the present system for providing location independent uniform service access for communication subscribers as operating in the system architected in FIG. 1.

FIG. 1 is the block diagram of the architecture of the present system for providing location independent uniform service access for communication subscribers incorporated into communication device 101 and one example of an existing commercial wireless communications system in which it is implemented, FIG. 2 illustrates in block diagram form the architecture of the present system for providing location independent uniform service access for communication subscribers 201, and FIG. 3 illustrates in flow diagram form the operation of the present system for providing location independent uniform service access for communication subscribers 201. In the description of the disclosed invention, the major entities are the Global Positioning Satellites 120 (one of which is shown for simplicity), communication device 101, base stations 102 and 104, and the mobile switching center 103. The mobile switching center 103 contains a mobile telecommunication controller 114 which includes an executive control processor (ECP) 104 connected to a ring peripheral controller node (RPCN) 105, both of which are linked to a ring structure 106. The ring structure 106 provides a transport means for communicating among the entities within the mobile switching center 103. Also contained within the mobile telecommunication controller 114 are call processing/database node (CDN) 107 and an administrative call processing node (ACDN) 108. A major function of these entitles is the execution of call processing associated with the mobile switching center 103. The 5ESS-2000 Switch DCS 105 provides the telephone connectivity between base stations 102 and 104. The 5ESS-2000 Switch DCS is connected to the IMS/CNI Ring 106 through SS7 nodes (SS7N) 109A, 109B. Base stations 102 and 104 are connected to the IMS/CNI Ring 106 through cell site nodes (CSN) 110A, 110B. The mobile switching center 103 has additional functionality such as billing, administration, and maintenance, requiring additional entities. However, the corresponding description of these entities are not essential to the embodiment of the disclosed invention. Base stations 102 and 104 communicate with communication device 101 using RF channels 111 and 112, respectively. RF channels 111 and 112 convey both command messages as well as digital data, which may represent voice signals being articulated at the communication device 101 and the far-end party. With a CDMA system, the mobile subscriber station communicates with at least one base station 102. In FIG. 1, the communication device 101 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a communication device 101 may communicate with only a single base station if determined as sufficient by the wireless communications system.

System for Providing Location Independent Uniform Service Access for Communication Subscribers The present system for providing location independent uniform service access for communication subscribers 201 is located within the communication device 101 and provides the capability to dynamically translate the local communications access paradigms to enable the subscriber to access the desired communications services without manually translating these access modalities from those known by the subscriber in their home service area to those used in this new locale. In this example, the communication device 101 includes a location determining element, such as a Global Positioning System 202 which is operable in well known fashion to dynamically identify the present location of the communication device 101 with a high degree of precision. In addition, the system for providing location independent uniform service access for communication subscribers 201 includes a translation memory 203 and a controller 204 to perform the operations that are preprogrammed into the system for providing location independent uniform service access for communication subscribers 201.

In operation, at step 301, the wireless communication subscriber initiates a call connection to a desired destination, such as to an Internet Service Provider with whom the subscriber has a service contract in their home service area. This call initiation in a cellular telecommunication system is a well known operation that is described herein to provide the framework for the following description of the system for providing location independent uniform service access for communication subscribers 201.

The system for providing location independent uniform service access for communication subscribers 201 responds to the subscriber's call initiation at step 301 by comparing the output of the Global Positioning System 202 with the data stored in translation memory 203 at step 302 to determine whether the communication device 101 is in its home location. If it is, call processing advances in conventional manner to place the wireless call. If there is an indication that the communication device 101 is not in its home location, at step 303 the controller 204 accesses the translation memory 203, inputting the present data output of the Global Positioning System 202 and service name descriptor to obtain an output from translation memory 203 indicative of the area code for the present location of the communication device 101. This area code is used at step 304 by controller 204 along with the number dialed by the subscriber to access translation memory 203 to retrieve data indicative of the access number corresponding to the subscriber dialed number for the locale in which the communication device 101 is presently active. At step 305, the system for providing location independent uniform service access for communication subscribers 201 passes the retrieved access number, along with the area code to the conventional circuitry in the communication device 101 for use in originating a communication connection in conventional manner at step 306. In well known fashion, a wireless service request is initiated when a transmitter-receiver pair in a base station 102, operating on a predetermined pair of radio frequencies, is turned on and a communication device 101, is tuned to the same pair of radio frequencies.

Base Stations and Control Channels

Mobile cellular telecommunication systems provide a plurality of concurrently active communications in the same service area, with the number of concurrently active communication connections exceeding the number of available radio channels. This is accomplished by reusing the channels via the provision of multiple base stations 102, 104 in the service area that is served by a single mobile switching center 103. The overall service area of a mobile switching center 103 is divided into a plurality of "cells", each of which includes a base station 102 and associated radio transmission tower. The radius of the cell is basically the distance from the base station tower to the furthest locus at which good reception between the communication device 101 and the base station 102 can be effected. The entire service area of a mobile switching center 103 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different frequencies and have different orthogonal coding. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations 101 and the base station 102. When a call is initiated, the control channel is used to communicate between the communication device 101 involved in the call and the local serving base station 102. The control messages locate and identify the communication device 101, determine the dialed number, and identify an available voice/data communication channel consisting of a pair of radio frequencies and orthogonal coding which is selected by the base station 102 for the communication connection. The radio unit in the communication device 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this communication device 101 to an adjacent cell, when the subscriber moves from the present cell to one of the adjoining cells. The transmitter power of the communication device 101 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

When a ground-based communication device 101 initiates a call connection, control signals from the local base station transmitter cause the frequency agile transponder in the ground-based communication device 101 to operate at the frequency of operation and orthogonal coding designated for that particular base station 102. As the ground-based communication device 101 moves from one base station 102 to another base station 104, the call connection is handed off to the successive base station 104 and the frequency agile transponder in the ground-based communication device 101 adjusts its frequency of operation and orthogonal coding to correspond to the frequency of operation and orthogonal coding of the transmitter located in the base station 104 in which the ground-based communication device 101 is presently operational. Call processing then advances to step 307 where the communication connection is extended from this transmitter-receiver pair of the base station 102 to another communications network, such as a common carrier public telephones network to complete the service request received from the communication device 101. This second stage of the communication connection is set up in well known fashion in the mobile switching center 103, which is connected to the common carrier public telephone network by incoming and outgoing trunks. The mobile switching center 103 contains a switching network to switch mobile customer voice and/or data signals from the communication link to an incoming or outgoing trunk.

The mobile telecommunication system is controlled by a mobile telecommunication controller 114 at the mobile switching center 103 and a base station controller (not shown) at or remotely connected to each base station 102, 104 associated with the mobile switching center 103. A plurality of data links connect the mobile telecommunication controller 114 and the associated base station controllers. The mobile telecommunication controller 114 operates under control of complex software and controls the switching network. The mobile telecommunication controller 114 also controls the actions of the associated base station controllers by generating and interpreting the control messages that are exchanged with the associated base station controllers over the data links. The base station controllers at each base station 102, 104, in response to control messages from the mobile telecommunication controller 114, control the transmitter-receiver pairs at the base station 102, 104. The control processes at each base station 102, 104 also control the tuning of the mobile subscriber stations 101 to the selected radio frequencies.

Call Handoff

When a communication device 101 approaches the boundary of a cell, the radio signal received at the base station 102 is at a minimum level. Since the communication device 101 is at the boundary of two cells, the signal power from the transmitter located in the adjacent cell is equal to or greater than the original cell and a handoff procedure is initiated. First, the cell base station 102 may initiate a mobile subscriber station location process in the adjoining cells. Alternatively, the serving base station 102 may utilize measurements from the communication device 101 by processing the received pilot strength measurement message. This first procedure is accomplished either by activation or continuous operation of a locating receiver in each of the adjoining cells which tunes to the radio frequency and channel on which the communication device 101 is transmitting. The measured signal strength of this signal, as received at each of the adjoining cells, is compared and the strongest signal is indicative at that base station 104 which is to receive the handoff. If there is an available voice channel in that cell, the communication device 101 is sent a message on the control channel to re-tune its transmitter to the identified available voice channel at the transmitter frequency and orthogonal coding of the selected cell. Simultaneously, the voice connection is switched at the base stations 102, 104 from one cell to the next via the Mobile Switching Center 103 to provide uninterrupted service. In this handoff process, the system for providing location independent uniform service access for communication subscribers 201, determines at step 308 whether the handoff process entails the transition to a new area code and the associated transfer to a new access number pursuant to the data stored in the translation table 203, using the above-defined process of steps 302–304. If the process determines that a new access number is appropriate, at step 309 the system for providing location independent uniform service access for communication subscribers 201 activates the wireless subscriber device 101 to initiate a call transfer request to the host wireless communication network.

Logical Service Identifiers

The above description illustrates the example of a wireless communication system which translates the subscriber's known service access numbers in their home service area into corresponding service access numbers that are used in the service area in which the subscriber is presently active. However, this is simply one example of the present system for providing location independent uniform service access for communication subscribers that are possible and the use of this system in wired communication systems as well as its use in Internet telephony services and the use of logical service identifiers is described below.

In particular, the use of logical service identifiers is shown in the table of FIG. 4, where services can be accessed in a logical manner by translating the subscriber-centric understanding of the service to the local service access paradigm. Therefore, a United States based subscriber dials "911" for emergency services, while a European subscriber would dial "119" for the same services in their locale. These subscribers can therefore access the desired emergency services by dialing their usual access number and the present system for providing location independent uniform service access for communication subscribers 101 provides a location sensitive context mapping to the logically defined service by simply translating the subscriber dialed number ("911" for example) to the local access number for that service ("119" for example). In addition, if the subscriber dials "0" for an operator or "555-1212" for directory assistance and is presently located in a non-English speaking country, the present system for providing location independent uniform service access for communication subscribers can translate the dialed number into the number used in the present service area that provides an English speaking operator. Thus, the present system for providing location independent uniform service access for communication subscribers can translate the dialed number into one of a number of possible local access numbers as a function of additional features that are activated by the subscriber, such as the language specific access request.

In addition, the use of a GPS system to identify the location of the subscriber's communication device is simply one of the many possible location determining systems that can be used. For example, in wireless communication systems, the base station can provide the location data. In addition, the central office switching systems can provide the subscriber with an indication of location, such as by providing area code or country code data in response to a query received from the present system for providing location independent uniform service access for communication subscribers.

Alternative Service Features

It is evident that there are numerous alternative embodiments of the present system for providing location independent uniform service access for communication subscribers that are possible. One such alternative entails the provision of this feature in a radio such that the radio automatically locates a locally broadcasting radio station that corresponds to the subscriber selected home location radio station and establishes communication with the radio station. Thus, if the subscriber selects National Public Radio on the preselect buttons on the radio, the radio uses the GPS data to identify the present location of the radio, and thence the radio broadcast frequency of the local affiliate of this network. Similarly, the feature can be used for other communication devices, such as a television, personal computer, wire-line telephone service, and the like to establish communication with the corresponding local affiliate of the subscriber desired destination.

Summary

The system for providing location independent uniform service access for communication subscribers provides the capability to dynamically translate the local communications access paradigms to enable the subscriber to access the desired communications services without manually translating these access modalities from those known by the subscriber in their home service area to those used in this new locale. This is accomplished by providing a location sensitive context mapping to logically defined services.

What is claimed is:

1. A system, operable in a subscriber communication device, for providing location independent uniform service access for communication subscribers, comprising:

means for storing data indicative of at least one location specific presence of each of a plurality of subscriber communication services;

means for automatically determining a location of said subscriber communication device;

means, responsive to said determined location and a subscriber selecting a one of said subscriber communication services, for retrieving data from said means for storing indicative of a one of said location specific presences corresponding to said selected subscriber communication service operational in said determined location;

means for activating said subscriber communication device using said retrieved data to establish communication with said one of said location specific presences corresponding to said selected subscriber communication service operational in said determined location;

means, responsive to movement of said subscriber communication device, for activating said means for retrieving to obtain data from said means for storing indicative of a one of said location specific presences corresponding to said selected subscriber communication service operational in said newly determined location; and means for comparing said one of said location specific presences corresponding to said selected subscriber communication service operational in said newly determined location with the one of said location specific presences presently in communication with said subscriber communication device.

2. The system for providing location independent uniform service access for communication subscribers of claim 1 further comprising:

means, responsive to said location specific presence for said newly determined location differing from said location specific presence presently in communication with said subscriber communication device, for transferring said communication with said subscriber communication device from said location specific presence presently in communication with said subscriber communication device to said location specific presence for said newly determined location.

3. A method of operating a system, operable in a subscriber communication device, for providing location independent uniform service access for communication subscribers, comprising the steps of:

storing data in a memory indicative of at least one location specific presence of each of a plurality of subscriber communication services;

automatically determining a location of said subscriber communication device; and retrieving, in response to said determined location and a subscriber selecting a one of said subscriber communication services, data from said memory indicative of a one of said location specific presences corresponding to said selected subscriber communication service operational in said determined location;

activating said subscriber communication device using said retrieved data to establish communication with said one of said location specific presences corresponding to said selected subscriber communication service operational in said determined location;

activating, in response to movement of said subscriber communication device, said step of retrieving to obtain data from said memory indicative of a one of said location specific presences corresponding to said selected subscriber communication service operational in said newly determined location; and comparing said one of said location specific presences corresponding to said selected subscriber communication service operational in said newly determined location with the one of said location specific presences presently in communication with said subscriber communication device.

4. The method of operating a system for providing location independent uniform service access for communication subscribers of claim 3 further comprising:

transferring, in response to said location specific presence for said newly determined location differing from said location specific presence presently in communication with said subscriber communication device, said communication with said subscriber communication device from said location specific presence presently in communication with said subscriber communication device to said location specific presence for said newly determined location.

5. A system, operable in a subscriber communication device, for providing location independent uniform service access for communication subscribers, comprising:

a memory for storing address data information usable for accessing at least one location specific presence of each of a plurality of subscriber communication services;

global positioning means for automatically determining a present location of said subscriber communication device;

memory access means, responsive to said determined location and a subscriber selecting a one of said subscriber communication services, for retrieving data from said means for storing indicative of a one of said location specific presences corresponding to said selected subscriber communication service operational in said determined location;

call rerouting means for activating said subscriber communication device using said retrieved data to establish communication with said one of said location specific presences corresponding to said selected subscriber communication service operational in said determined location;

means, responsive to movement of said subscriber communication device, for activating said means for retrieving to obtain address data from said memory indicative of a one of said location specific presences corresponding to said selected subscriber communication service operational in said newly determined location; and means for comparing said one of said location specific presences corresponding to said selected subscriber communication service operational in said newly determined location with the one of said location specific presences presently in communication with said subscriber communication device.

6. The system for providing location independent uniform service access for communication subscribers of claim 5 further comprising:

means, responsive to said location specific presence for said newly determined location differing from said location specific presence presently in communication with said subscriber communication device, for transferring said communication with said subscriber communication device from said location specific presence presently in communication with said subscriber communication device to said location specific presence for said newly determined location.

* * * * *